United States Patent [19]

Takata et al.

[11] Patent Number: 4,850,553

[45] Date of Patent: Jul. 25, 1989

[54] EJECTOR ARRANGEMENT FOR AIRCRAFT STORE RACKS

[75] Inventors: Earl K. Takata, Arlington Heights, Ill.; Ben E. Paul, Costa Mesa, Calif.; John P. Nordhaus, Northbrook, Ill.

[73] Assignee: Scot, Incorporated, Downers Grove, Ill.

[21] Appl. No.: 26,039

[22] Filed: Mar. 16, 1987

Related U.S. Application Data

[63] Continuation-in-part of Ser. No. 906,742, Sep. 12, 1986, abandoned.

[51] Int. Cl.[4] ............................................... B64D 1/02
[52] U.S. Cl. .................................. 244/137.4; 89/1.54; 294/82.26; 294/82.28; 60/636
[58] Field of Search ............... 244/137.4, 137.1, 118.5; 60/635, 636; 89/1.54, 1.58, 1.59; 294/82.26, 82.28, 82.29, 82.36

[56] References Cited

U.S. PATENT DOCUMENTS

| | | | |
|---|---|---|---|
| 2,764,374 | 9/1956 | Anderson et al. | 244/137.4 |
| 3,010,752 | 11/1961 | Geffner | 244/137.4 |
| 3,677,506 | 7/1972 | La Roe | 244/137 |
| 4,043,525 | 8/1977 | Jakubowski | 89/1.53 |
| 4,049,222 | 9/1977 | Peterson | 244/137 R |
| 4,050,656 | 9/1977 | Peterson | 244/137 R |
| 4,075,929 | 2/1978 | Peterson | 91/168 |
| 4,088,287 | 5/1978 | Hasquenoph et al. | 89/1.54 |
| 4,132,147 | 1/1979 | Cantaldo | 89/1.58 |
| 4,388,853 | 6/1983 | Griffin et al. | 89/1.57 |

FOREIGN PATENT DOCUMENTS 1005266  9/1965  United Kingdom ............. 244/137.4

OTHER PUBLICATIONS

Technical Manuel T.O. 11B29-3-25-2, Pub. 3/26/79, 1st 4, pp. & Introduction, Together with Sections I–III, FIG. 7-4, and pp. 7-19 & 20 Submitted.

*Primary Examiner*—Galen Barefoot
*Attorney, Agent, or Firm*—Mann, McWilliams, Zummer & Sweeney

[57] ABSTRACT

An ejector arrangement for aircraft store racks that are carried by military type aircraft and the like for releasably attaching to the aircraft stores such as conventional or nuclear weapons, in which the ejector arrangement is duplicated in mirror image form at the usual fore and aft positions of the rack, with each ejector arrangement being in the form of an elongated housing with which the usual fore and aft sway braces are respectively integral, which ejector housing internally defines an elongate internal chamber in which are mounted an outer cylinder and inner cylinder that in the dormant relation of the ejector are in substantially telescoped coaxial relation with like ends of same disposed adjacent one end of the housing to which the rack ballistic gas is supplied, with the ejector cylinders at their other ends being exposed externally of the other end of the housing and keyed for sequential movement to their extended relations under the action of the ballistic gas involved, to thrust the store which at the same time has been released from the aircraft, beyond the aircraft's air stream envelope; the inner and outer cylinders of the rack ejectors, in moving from the ejector dormant relation to the ejector extended relation, act under the ballistic gas pressure released within the respective rack ejectors, to apply to the store the needed unbalanced force, and in a more or less uniform, sequential manner, to effect application to the store of maximized release thrust during the thrust stroke of the rack ejectors.

9 Claims, 7 Drawing Sheets

EJECTOR ARRANGEMENT FOR AIRCRAFT STORE RACKS

This application is a continuation-in-part of our now abandoned application Ser. No. 906,742, filed Sept. 12, 1986.

This invention relates to military type aircraft racks for releasably securing to the aircraft stores, such as conventional and nuclear weapons, or the like, and more particularly to a store rack ejector arrangement for thrusting the store away from the aircraft and beyond the aircraft's air stream envelope, once the store has been released from the rack in flight.

So-called bomb or missile racks that are applied to military type aircraft to releasably secure to the aircraft stores such as conventional or nuclear weapons have application in aircraft bomb bays for bomb type weapons, and under the wing applications for releasably retaining missiles and rockets to the aircraft prior to release. One such rack arrangement is the USAF type MAU-12B/A bomb ejector rack assembly that is the subject of Technical Manual T.O. 11B29-3-25-2, published under the authority of the Secretary of the Air Force Mar. 26, 1979. This bomb rack is designed to suspend on aircraft, and forcibly eject, or permit free-fall release, conventional or nuclear stores, up to and including those in the 5,000 pound weight class (as defined in Table 1 of military specification MIL-A-8591).

See also U.S. Pat. Nos. 4,049,222, granted Sept. 20, 1977, and 4,050,656, granted Sept. 27, 1977, to Paul F. Peterson, for illustrations of bomb racks of the type to which the invention relates; see also U.S. Pat. No. 4,075,929, granted Feb. 28, 1978 to the said Paul F. Peterson relating to a three stage ejector device for use in connection with bomb racks of the type to which the invention relates. See also LaRoe U.S. Pat. No. 3,677,506, granted July 18, 1972. The disclosures of all of said references are incorporated herein by this reference.

Store racks of the type indicated are designed to releasably secure to the aircraft conventional or nuclear weapons in the form of bombs, rockets, or missiles, as well as other stores, such as external fuel tanks, etc. Such racks may be designed for mounting internally of the aircraft, as in the aircraft bomb bay, for either single store holding action and, release functions or as part of a rotary launcher arrangement, or the rack may be applied to under the wing applications for providing for releasable securement of the store to the aircraft and simultaneous release and ejection of the store from the aircraft.

Such bomb racks typically include at least one set of shackle assemblies involving pivotally acting hooks that respectively engage spaced lugs of the store to releasably secure the store to the aircraft, two side plate assemblies, mounting channel assemblies, a pair of fore and aft ejector assemblies, a gas tube assembly, a breech assembly to which the cartridges that form the source of the actuating ballistic gas are applied, arming solenoids, and a wire harness assembly. Basically, the shackle assemblies are actuated and set to dispose their hooks in closed positions to receive the store lugs and secure the store to the aircraft, and when the store is to be released in flight, and assuming that the rack has been armed to forcibly eject the store on its release by the rack, an electrical signal energizes the arming solenoids that in turn ignite the breech assembly cartridges that generate in an instantaneous manner the high pressure ballistic gas that is to operate the rack to both release and simultaneously eject the store away from the aircraft, and specifically, out of the aircraft air stream envelope.

Conventionally, part of the ballistic gas so generated is connected to the rack mechanism that shifts the shackle assembly hooks to their open positions, and the rest of the ballistic gas is connected to the rack ejectors that then operate to thrust the store away from the aircraft (where the rack is armed for forcible ejection of the store).

The present invention is concerned with the arrangement of the ejectors of the rack, and specifically, with the rack ejector mechanisms at the fore and aft positions of the rack that are relied upon to forcibly eject the store from the aircraft.

Conventional rack ejectors, which typically involve a single piston ballistic actuator, when actuated to forcibly eject the store, such as a bomb, missile, or rocket, which has also been released by the same signal that generates the high pressure ballistic gas that is transmitted to the rack ejectors for that purpose, effect a high pressure force application to the store, fore and aft of the rack, with this high pressure force application tapering off as the ejection procedure or thrust action on the store proceeds, that is, the thrust action being applied to the store, to thrust same away from the aircraft, tapers off as the rack ejectors shift from their dormant relation to their extended relation. This leaves to chance that the store will be thrust sufficiently forcibly away from the aircraft so that the store will be pushed beyond the aircraft's air stream envelope at the fast operational speeds of modern military type aircraft (Mach 1 or greater).

A principal object of the present invention is to provide a store rack dual piston ejector arrangement that, when the store rack is actuated to both release and eject the store, operates in a smooth operational sequence to smoothly apply to the store the unbalanced outwardly acting force that is needed for fail-safe thrusting of the store from the aircraft's air stream envelope, and at the high speeds current high performance aircraft are capable of traveling (exceeding Mach 1).

Another principal object of the invention is to provide a store rack dual piston ejector mechanism for incorporation at the fore and aft ejector positions of conventional store racks of the type indicated, which ejector mechanism involves a telescoping multicylinder assembly that in the dormant state of the ejector remains in fully retracted telescoped relation within the store rack until and unless the store is released in flight using the store rack to which it is connected, in which case the store rack ejectors are actuated and simultaneously function automatically in a smooth operational sequence in effecting the release of the store, to smoothly apply to the (store that has been carried by the rack) for the full ejector stroke the unbalanced force that is required to fail-safe push the store beyond the aircraft's air stream envelope, even when the aircraft is traveling at speeds exceeding Mach 1, and is reversible for the same purpose.

Yet other objects of the invention are to provide a store rack dual piston ejector mechanism for use at the fore and aft ejector positions of the rack that accommodate retention of the store on the aircraft through the rack shackle mechanism or mechanisms indefinitely, and with consistent reliability, but when in-flight release and ejection of the store is to occur, the rack ejector mechanisms will reliably operate, using the usual ballistic gas initiator equipment to actuate same, to effect store ejection away from the aircraft, to provide a store rack ejector arrangement that is economical of manufacture, to provide a store rack ejector arrangement that permits the store rack to be utilized to releasably secure the store to the aircraft for extended periods and may, in addition to flight time, also include multiple take offs and landings, prior to in-flight launching of the store, and that, when the store is to be launched, the rack ejector mechanisms operates in a fail-safe manner to effect store ejection from the aircraft free of the aircraft's air stream envelope.

In accordance with the invention, the store rack fore and aft ejector mechanisms each comprise a dual piston-cylinder telescoping assembly that includes an elongate housing, with which the rack sway braces at the fore and aft positions are integral, and which defines an internal chamber extending longitudinally of the housing and mounting in said chamber an outer cylinder and an inner cylinder that is disposed within the outer cylinder, with each such cylinder being equipped with its own pistons that are to be exposed to the ejector actuating ballistic gas.

The chamber of the respective housings and the cylinders received in same are in telescoped substantially coaxial dormant relation in the normal installed relation of the rack, with the cylinders of each housing chamber having the piston forming like ends of same disposed adjacent one end of the ejector housing involved, with such ejector housing being connected to the source of ballistic gas with which the store rack is equipped and including means for exposing the said like ends of the respective ejector cylinders to the ballistic gas, when the source of ballistic gas supplies the ballistic gas to the respective ejector housings.

The sets of cylinders of the respective rack ejectors at their other ends are exposed exteriorly of the other end of the respective ejector housings, and are keyed for sequential movement to their extended relations from the respective ejector housings under the action of the ballistic gas supplied to same, to thrust the store, when same is released from the aircraft by the rack involved, away from the aircraft. The inner and outer cylinders of each rack ejector, in moving from the ejector dormant relation to the ejector extended relation, act sequentially under the ballistic gas pressure released within the respective ejectors to apply on the store the needed unbalanced force in a more or less uniform sequential manner to effect application to the store of maximized release thrust. The respective fore and aft rack ejectors are arranged so that, under the pressure of the ballistic gas that is released to the respective ejector mechanisms, the inner cylinders thereof first move outwardly of the outer cylinders (which remain keyed in place) and against the store for the most of the length of travel of the inner cylinder with respect to the outer cylinder, with the outer cylinder then being released and the two cylinders then both moving in the ejection direction; the inner cylinder becomes keyed to the outer cylinder. The ejection movement involved actuates a cammed latch key arrangement that effects release of the outer cylinders with respect to the rack housings involved, and with continued outward movement of the inner cylinder and jointly with the outer cylinder. The cammed latch key arrangement involved and the interaction between the inner and outer cylinders of each ejector effects release of a movable retainer sleeve that is previously keyed to the ejector housing involved, with further joint outward thrust movement of the inner and outer cylinders continuing under the action of the ballistic gas pressure of both their pistons, until an annular stop or base flange of the outer cylinder engages an annular stop surface defined by a component part of the ejector housing involved. The inner cylinder of each ejector is equipped with a valve assembly for then venting to atmosphere the ballistic gas that actuates the respective rack ejectors involved. Also, the ejectors may be returned after use to their retracted relations for reuse in the manner indicated.

Other objects, uses and advantages will be obvious or become apparent from a consideration of the following detailed description and the application drawings in which like parts are indicated by similar reference numerals throughout the several views.

However, it is to be distinctly understood that the specific drawing illustrations provided are supplied primarily to comply with the requirements of the Patent Laws, and that the invention is susceptible of other embodiments and modifications that will be readily apparent to those skilled in the art, which are intended to be covered by the appended claims.

GENERAL DESCRIPTION

Background of Invention

Figure 1:
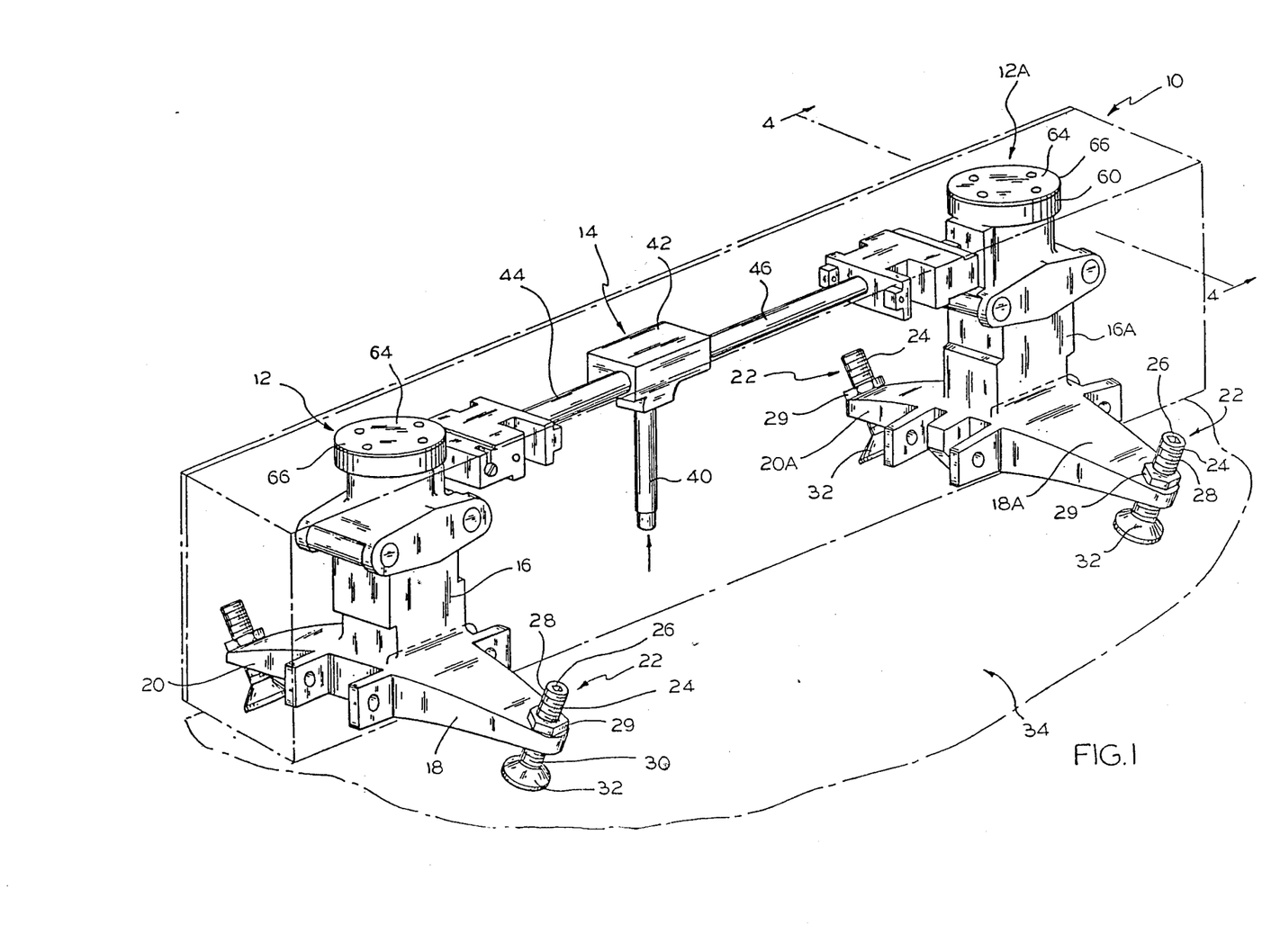
FIG. 1 is a diagrammatic perspective view showing in largely block diagram form a typical store rack indicated by the broken lines, with the rack fore and aft ejector mechanisms, and the ballistic gas conduiting to same, being shown in full lines, as well as the rack sway brace mechanisms, with a missile held by the rack illustrated being partially shown in broken lines.

Reference numeral 10 of FIG. 1 generally indicates a store ejector rack assembly arranged in accordance with the aforecited references to suspend or mount on aircraft and forcibly eject conventional or nuclear stores. The assembly 10, as is well known in the art, can be applied within the aircraft for this purpose, such as, for instance, within the aircraft bomb bay, or the assembly 10 can be applied in a conventional under the wing application, or in any other operable arrangement that is known to the art.

The assembly 10 is largely diagrammatically illustrated and is assumed to include the conventional two side plate assemblies, the mounting channel assemblies, the shackle assemblies, the breech assembly, the arming solenoids, and the wire harness assembly (all not shown), in addition to the fore and aft ejector mechanisms 12 and 12A that are diagrammatically illustrated in association with the diagrammatically illustrated ballistic gas tube assembly, 14.

The respective fore and aft ejector assemblies 12 and 12A, as is per se conventional, are mirror images of each other, but are otherwise identical, and are arranged in accordance with the present invention. The ejector mechanism 12 includes a housing 16 that is configured externally in a conventional manner to define the usual sway brace integral arms 18 and 20 that are each equipped with a conventional adjustable screw set brace device 22 that in the form shown comprises externally threaded shank 24 that is hex socketed as at 26 at its end 28 for reception of a suitable Allen type turning wrench or the like, which shank 24 is threadedly mounted in the internally threaded apertures 27 formed in the respective sway brace arms 18 and 20 (see FIGS. 1, 2, and 4) and has swivelly mounted on its other end 30 a suitable foot or pad 32 that is to be applied against the missile 34 or other store carried by the assembly 10.

The aft ejector mechanism 12A is similarly arranged, and includes housing 16A that includes exterior surfacing which is conventionally arranged, and thus includes integral sway brace arms 18A and 20A that are similar to the arms 18 and 20 of ejector mechanism 12. Each of the arms 18A and 20A is equipped with a device 22 that serves the same purposes as the devices 22 of the ejector mechanism 12.

When the store, such as a missile 34, is applied to the assembly 10, the usual operating mechanism of the assembly 10 is operated to apply the shackle hooks to the spaced lugs (not shown, but see U.S. Pat. Nos. 3,677,506, 4,049,222, 4,050,656 that have been referred to) with which the missile or other similar store is conventionally equipped for the purpose of holding the store in place. At this time the adjustable foot devices 22 are adjusted to apply their feet 32 against the exterior of the missile to hold it against sway, and the nuts 29 of each assembly 22 are tightened against the respective sway brace arms to lock the threaded shanks 24 in place, as fully seated in sway preventing relation against the missile 34 or other store.

As is conventional, the ballistic gas tube assembly 14 includes upright conduit 40 that is connected to the breech assembly (not shown) or assembly 10 to which the usual cartridges are applied for forming the operating ballistic gas that is conventionally generated by the aforementioned cartridges when the store is to be released in flight, upon an electrical signal being transmitted to the assembly 10, whereby the ballistic gas in question is generated and simultaneously unlocks the shackle assemblies and is transmitted to the ejector mechanisms 12 and 12A for thrusting the store carried by the assembly 10 away from the aircraft, as is conventional with so-called bomb racks of the type in question.

With regard to the assembly 10 that is illustrated, part of the ballistic gas in question enters the upright conduit 40 and is transmitted to suitable connector structure 42 where the gas flow divides and passes through the respective conduits 44 and 46 and their associated structures to the respective ejector mechanisms 12 and 12A that are the subject of the present invention.

The Invention Store Ejectors

As indicated, the ejector mechanisms 12 and 12A are basically the same, with they being in effect "mirror images" of each other in view of the fact that the ejector mechanism 12 is the "fore" ejector of assembly 10, while the ejector mechanism 12A is the "aft" ejector of the assembly 10. Thus, the assembly 10 is normally applied to the aircraft so as to extend parallel to the direction of movement of the aircraft, with the ejector 12 being at the leading end or head end of the assembly 10, and the ejector mechanism 12A being at the trailing or rear end of the assembly 10, regardless of whether the assembly 10 is mounted in the aircraft bomb bay or at an under the wing position.

The showings of FIGS. 2-9 illustrates specifically the aft ejector mechanism 12A or parts thereof, but it is to be understood that the fore ejector member 12 is similarly arranged in this context. For this reason only the specifics of the ejector 12A are described nd illustrated to avoid what otherwise would be a duplicate disclosure of the specifics of ejector mechanism 12.

It is also pointed out that in the normal application of the assembly 10 to an aircraft, the assembly 10 is applied to the aircraft so that when the aircraft is in flight, the assembly 10 is essentially horizontally disposed so that the housings 16 and 16A are essentially in upright position, as is the conduit 40, while the conduits 44 and 46 are essentially horizontally disposed, with the upper ends of the ejector mechanisms being at the upper side of the assembly 10, as the assembly 10 is illustrated in FIG. 1.

Figures 2, 3:
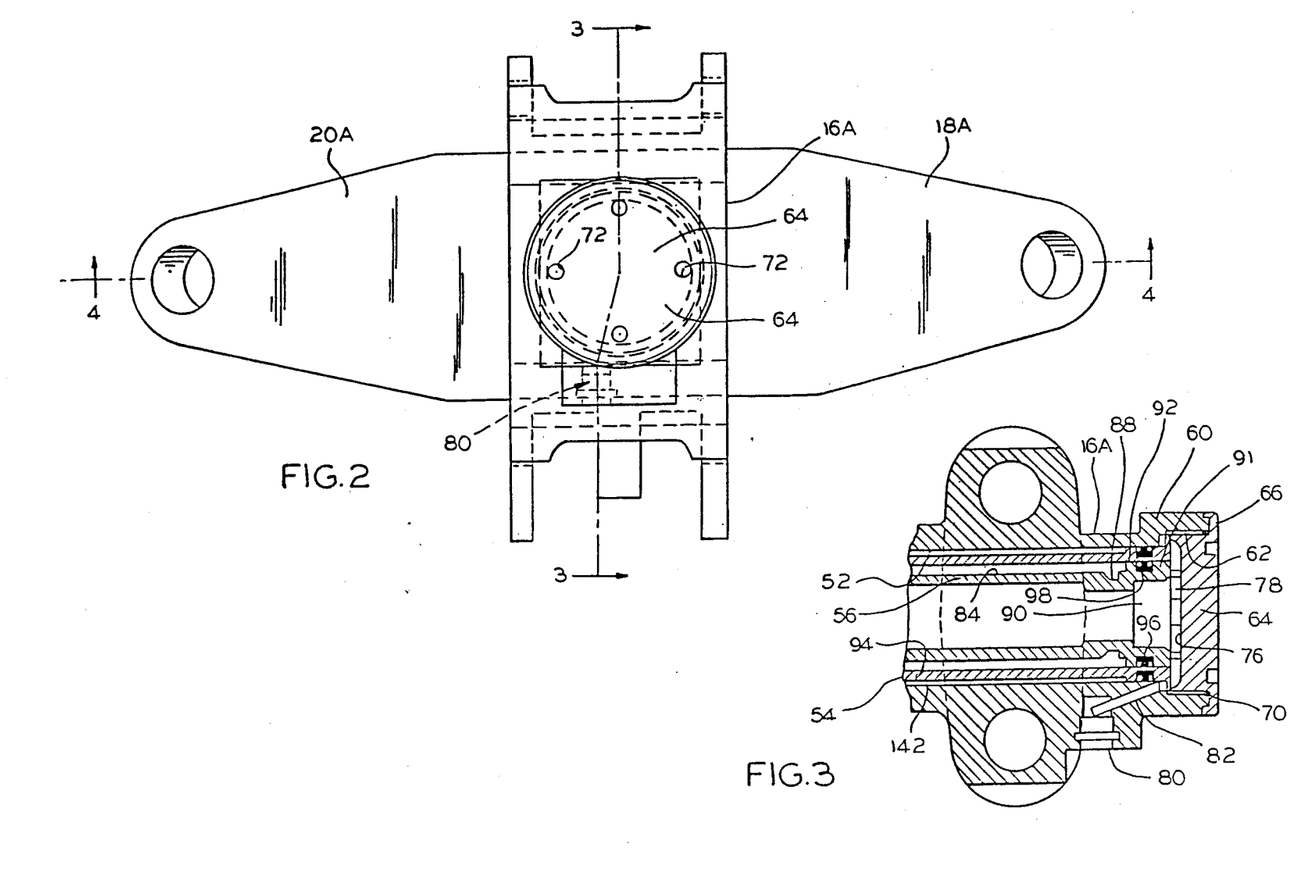
FIG. 2 is a top plan view of the aft actuator mechanism shown in FIG. 1.
FIG. 3 is a fragmental sectional view taken substantially along line 3—3 of FIG. 2 showing the manner in which ejector mechanisms are exposed to high pressure ballistic gas generated by the rack of FIG. 1 when the store rack involved is to be actuated to both release the store and eject same utilizing the illustrated ejector mechanisms.
Figure 4:
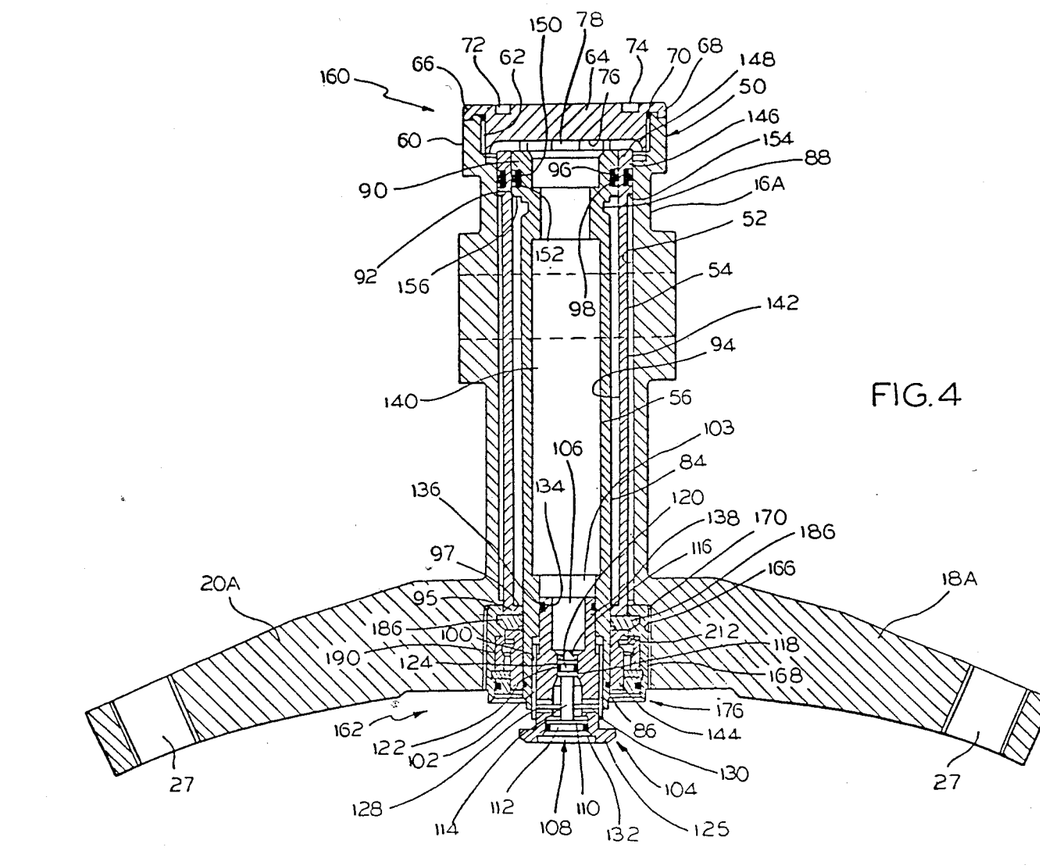
FIG. 4 is a sectional view substantially along line 4—4 of FIG. 2, showing the aft ejector mechanism in its dormant relation.

Referring now more specifically to FIGS. 2-4, the ejector mechanisms 12 and 12A each comprise a telescoping assembly 50 that includes the respective housings 16 and 16A. The respective housings 16 and 16A are each formed to define an elongate chamber 52. The respective chambers 52 each define an inner surfacing 53 and shiftably mount an outer cylinder 54 and an inner cylinder 56, with the respective housings 16 and 16A, and the respective cylinders 54 and 56 received in same, in the dormant relation of the respective ejector mechanisms 12 and 12A, being in the coaxial, telescoped relation indicated in FIGS. 3 and 4. It is pointed out, in this connection, that FIGS. 5-6B, because of the enlarged fragments of the assembly 50 that they illustrate, more accurately delineate the configurations of the respective components illustrated, with the remaining views being largely diagrammatic in nature As indicated in the showing of FIGS. 2-4, and 9, the upper ends 60 of the respective housings 16 and 16A is internally threaded as indicated at 62 for threadedly receiving a closure plug 64 that is flanged as at 66 for seating against the corresponding configuration of the housing end 68, and against suitable O-ring seal 70. The plug 64 in the form shown is provided with two pair of equally spaced recesses 72 for receiving the prongs of conventional turning tool of any appropriate type for threading the plug 64 into sealing relation with the respective housings 16 and 16A.

The plug 64 in the form shown is indented as at 76 to define within the respective housings 16 and 16A ballistic gas receiving chamber 78 that, when the assembly 10 is operated in flight to release the store it carries, such as the missile 34, receives the ballistic gas that has been released within the assembly 10 through the housing aperture 80 and the passage 82 (see FIG. 3) that is formed in the respective housing members 16 and 16A that communicates between the aperture 80 and the chamber 78 for activating the telescoping assembly 50 of the respective actuator mechanisms 12 and 12A.

The inner cylinder 56 defines an outer cylindrical surfacing 84 that extends between the outer end 86 of the inner cylinder 56 and an annular slot or recess 88 formed in the inner cylinder 56 adjacent its inner end or base 90 that is suitably laterally flanged as at 91 form its piston 90A and to define an external diameter surfacing 92 that has a diameter which substantially complements the internal diameter surfacing 94 of the outer cylinder 54. The inner cylinder end 90 is suitably recessed circumambiently thereabout as at 96 to receive suitable annular seal 98 that is received in appropriate sealing relation with the surfacing 94 of the outer cylinder 54. The annular slot or recess 88 includes annular cam surface 89 that is clearly shown in a number of the drawing figures, the function of which will be described hereinafter.

The inner cylinder 56 is counterbored as at 100 adjacent its outer ends 86, internally threaded as at 102 and bored as at 103, to threadedly and thus fixedly receive a valve sleeve 104, the bore 106 of which is of multi sized configuration for application thereto of the stemmed venting valve member 108, which comprises a valve head 110, that is shiftably mounted in counterbore 112 of valve sleeve 104 and that is coaxial with its bore 106, with the valve member 108 including a stem 114 formed with spaced ridges 116 and 118 that define a groove 120 for suitable O-ring seal 122 that in the sealing relation of the valve 108, is seated in sealed relation in and with the throat restriction 124 of the bore 106, when the telescoping assembly 50 is readied for use and is disposed in its telescoping relation shown in FIG. 4. Valve sleeve 104 is formed to define annular flange 125 that seats against the store exterior in the dormant relation of the telescoping assemblies 50, which is recessed as at 111 to receive valve head 110 in the retracted position of valve member 105.

The sleeve 104 has threadedly applied to same a pair of opposed centering screws 128 and 130 in recessed position in the sleeve 104 and seated in guiding relation with and against the stem 114 of the valve member 108, as indicated in FIG. 4. In the retracted position of the sleeve member 104, a suitable O-ring seal 132 seated on the valve head 110 is in sealing relation thereabout with sleeve member 104, and the sleeve 104 is suitably recessed as at 134 adjacent its inner end to receive suitable O-ring seal 136 that is in sealing relation with the bore 103 of the inner cylinder 56 in which the end 138 of the sleeve 104 is mounted. Seal ring 132 is applied to member 104 between its flanges 133 and 135 (see FIG. 8).

As indicated in FIG. 4, the inner cylinder 56 defines internal chamber 140 that communicates through cylinder 56 from chamber 78 to the bore 106 of valve member 108.

The outer cylinder 54 defines the external cylindrical surfacing 142 that extends between its external shoulder 210 and an annular flange 146 that is defined by its inner or base end 148 (forming its piston 148A), the latter being suitable annularly slotted as at 150 (see FIG. 5) to receive suitable annular seal 152 that is in sealing relation with the inner surfacing 53 of the respective housings 16 and 16A. The flange 146 defines the annular stop surface 154 of the outer cylinder 54, while the inner cylinder 56 has a similar annular surface 156 defined by its base end 90 adjacent the annular slot or recess 88, as indicated in FIG. 4. Surface 156, however, does not serve a "stop" function, as will be made clear hereinafter.

The telescoping assemblies 50 thus define an upper or base end 160 and a lower open end 162 at which the end 86 of the inner cylinder 56, and the end 144 of the outer cylinder 54, are exposed. The respective housings 16 and 16A adjacent the lower end 162 of the respective telescoping assemblies 50 are counterbored as at 166 in coaxial relation with the chamber 52 and internally threaded as at 167 in the same manner to threadedly and fixedly receive retainer member 168 that is best shown, together with associated components in enlarged diagrammatic FIGS. 6 and 7. The retainer member 168 is applied against suitable O-ring seal 170 in sealing relation with the respective housings 16 and 16A. Retainer member 168 defines outer end 172 and inner end 174, with the outer end 172 being of tapered flanged configuration where indicated at 176 and being internally shouldered as at 178 at its inner end 174 to define a pair of opposed stop surfaces 180 and 181, between which is formed a plurality of key receiving recesses 184 disposed in spaced apart relation circumambiently about the outer cylinder 54 which define the respective cam surfaces 185, and respectively receive one of a plurality of outer cylinder latch keys 186 that are collectively shown in diagrammatic FIG. 9; keys 186 are also respectively received in the respective cross openings or apertures 188 (see FIGS. 4-7 and 9), formed in the outer end 144 of the outer cylinder 54 in respective circumferential alignment with the respective recesses 184. The latch keys 186 are proportioned so that when each telescoping assembly 50 is disposed in the telescoping relation shown in FIG. 4, the respective latch keys 186 in seating in the respective recesses 184, extend through the outer cylinder apertures 188 to bring their inner ends 186A into substantial engagement with the external surfacing 84 of the inner cylinder 156 and their outer ends disposed well into the respective recesses 184, and in engagement with their respective cam surfaces 185, whereby the outer cylinder 54 of each ejector 12 and 12A is respectively keyed to the respective tubular members 16 and 16A thereof.

The retainer sleeve 168 has keyed to same but slidably mounts retaining or retainer ring 190 that seats against the stop surface 181 of shoulder 178 of the stationary sleeve 168, with the retaining ring 190 being suitably annularly slotted as at 192 at its outer end 194 to receive the annular sealing ring 196 that is in sealing engagement with the fixed sleeve inner cylindrical surfacing 198 that extends longitudinally thereof to the stop surface 181 of shoulder 178. The retainer sleeve 168 is formed with a pair of oppositely disposed recesses 200 and 202 (see, for instance FIG. 6), in which are respectively received opposite ends 203 of the respective retainer ring latch keys 204 that lie in the oppositely disposed cross openings or apertures 206 and 208 of the retainer ring 190 and serve to key the ring 190 to sleeve 168 in the dormant relation and during initial portion of the ejector stroke (as hereinafter made clear); in the dormant telescoped relation of the telescoping assembly 50, the retainer ring latch keys 204 at their inner ends 203A also bear against the outer cylinder 54 (at a reduced diameter external surfacing 205 thereof adjacent outer cylinder end 144), thereby keying retaining ring 190 to the fixed sleeve 168 in the dormant relation and through the initial stages of the ejecting operation of the telescoping assemblies 50. Keys 204 are each formed with a pair of retaining wings 207 (see FIG. 9) that keep them within ring 190 when ring 190 leaves fixed retainer 168 (as ejection proceeds).

The retainer ring 190 also is formed with an internal annular slot or recess 209 having annular slanted surface 209A; at the location of each key 186 circumferentially of the respective assemblies 50, the retainer ring 190 thereof is formed with a through aperture 213 (the functions of recess 209, surface 209A, and apertures 213 will be described hereinafter).

Figures 5, 6:
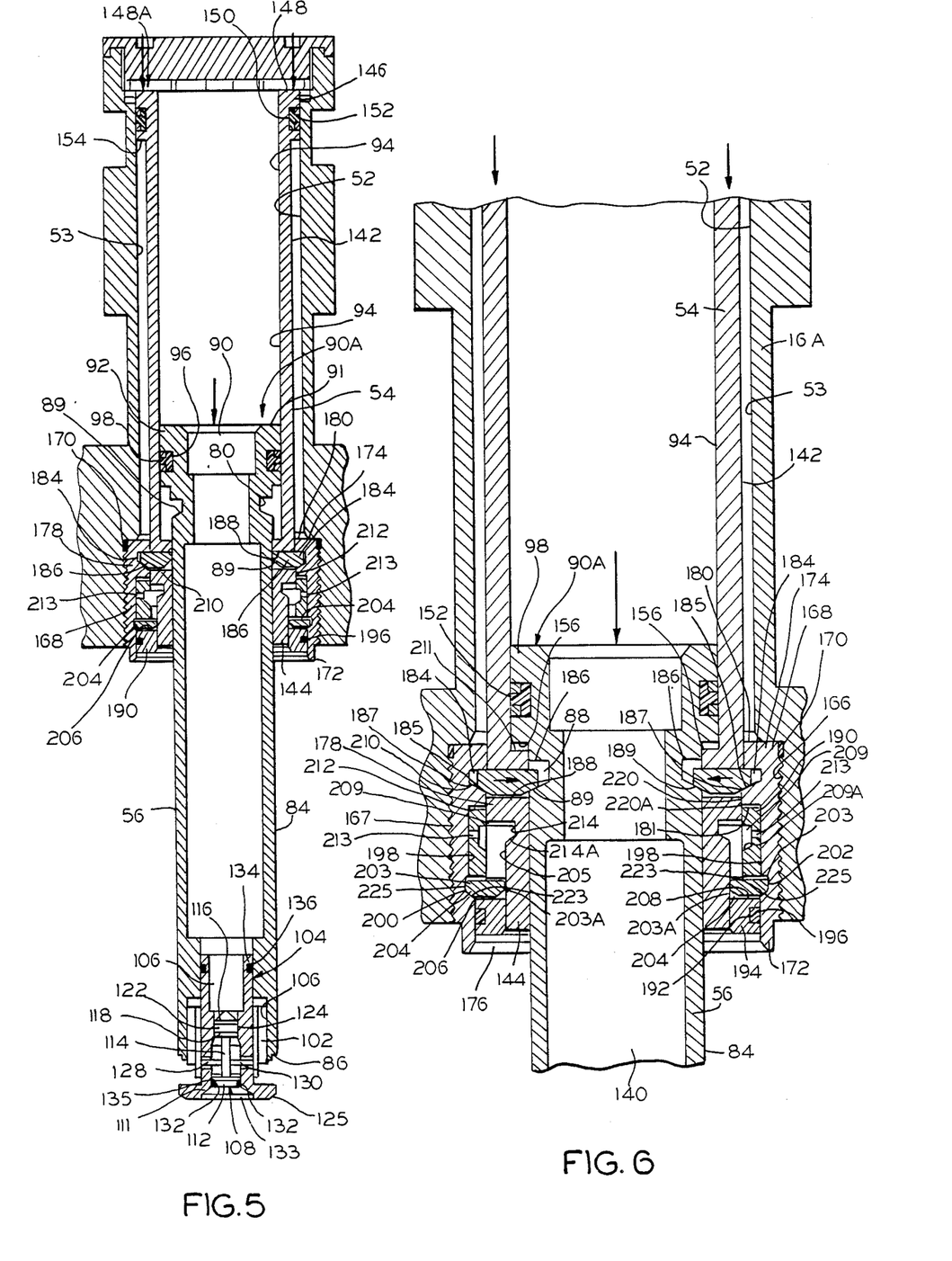
FIG. 5 is a view similar to that of FIG. 4, showing the aft ejector mechanism in an initial stage of extension.
FIG. 6 is a fragmental view of the ejector mechanism two cylinders at relative positions where the outer cylinder has initiated its ejecting movement.
Figure 6A:
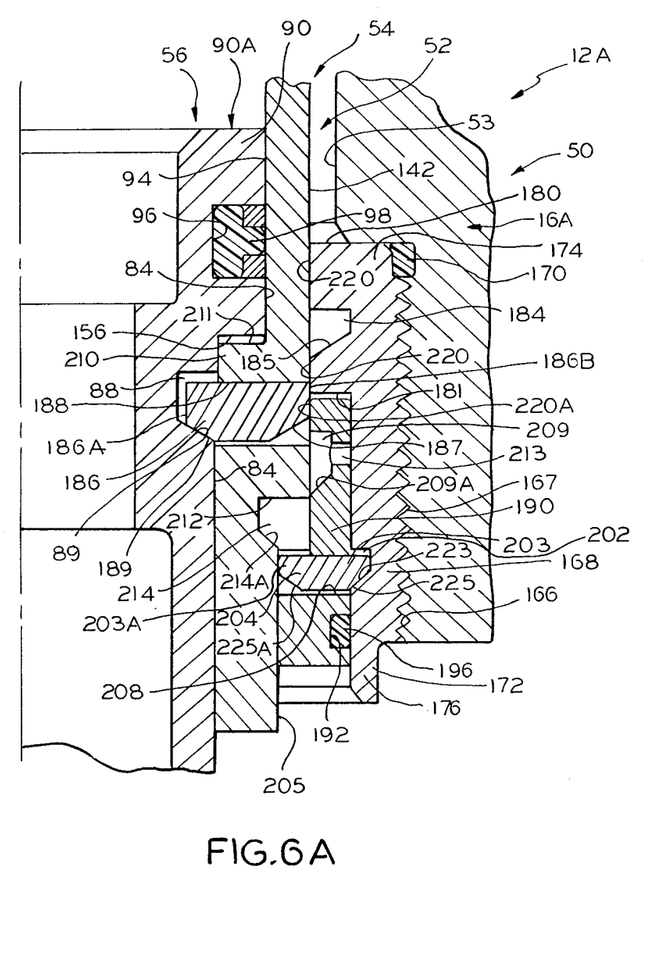
FIGS. 6A and 6B are fragmental views showing one side of the aft ejector mechanism at its latching keys at sequential positions of operation, with the components illustrated being greatly enlarged.
Figure 6B:
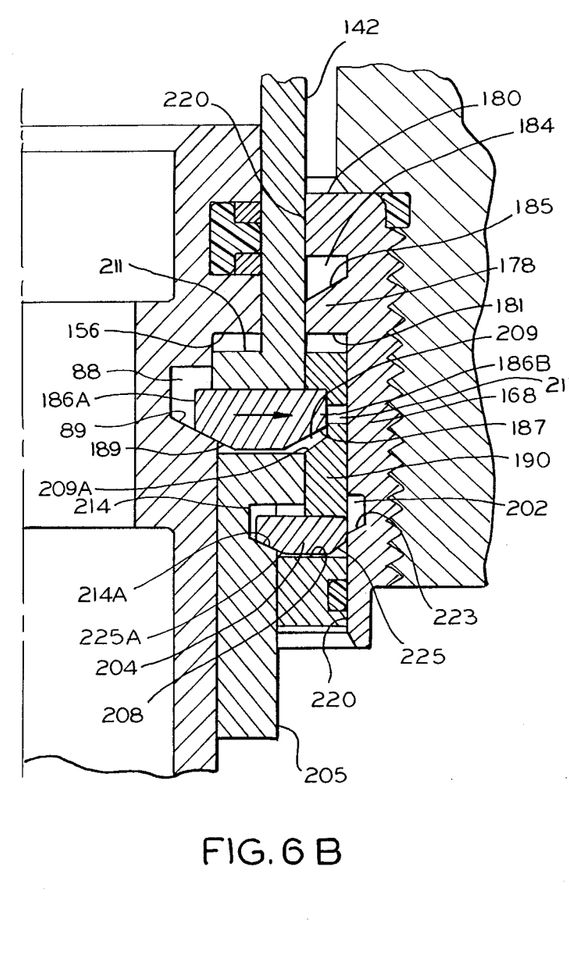
Figure 7:
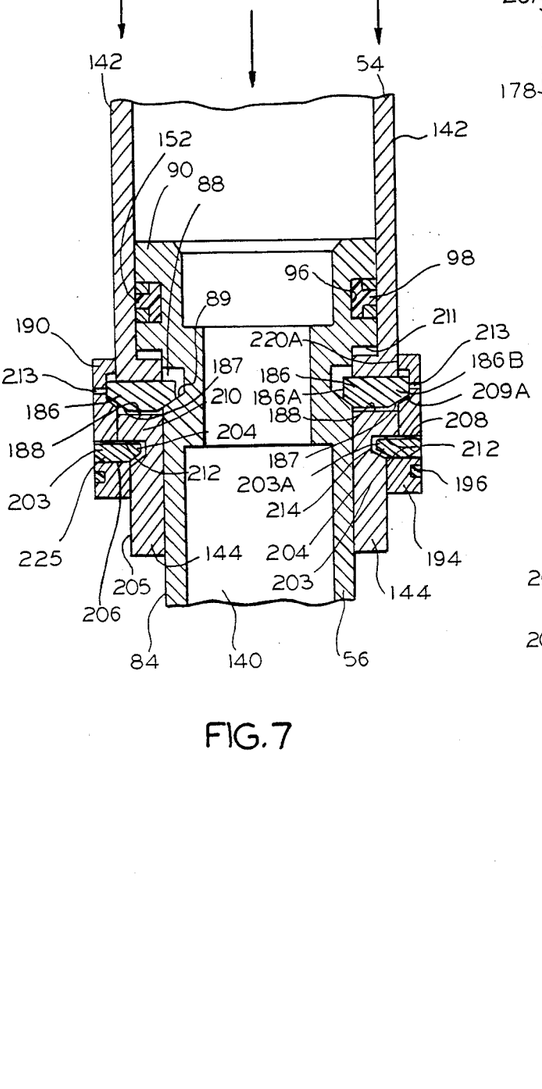
FIG. 7 is a fragmental sectional view similar to that of FIG. 6, but showing both cylinders of the ejector free of the ejector housing and the then relative positioning of the ejector latching keys.

As best shown in FIGS. 6-6B, due to the enlarged scale of those Figures, the outer cylinder 54 outwardly or downwardly of the apertures 188 defines shoulder 210 forming annular abutment surface 212 that forms part of annular indentation 214 defined by the outer end 144 of the outer cylinder 54, with the latter having the indicated external cylindrical surfacing 205 that is of less external diameter than the outer cylinder external surfacing 142. The outer cylinder shoulder 210 forms internal annular transverse surface 211 within the outer cylinder 54 (see FIG. 6). Annular indentation 214 includes annular slanted surface 214A that complements the slanted surfaces 225A of the respective keys 204.

The stationary sleeve 168 along its shouldered inner end 174 defines internal annular surfacing 220 that complements the external surfacing 142 of the outer cylinder 54.

As best brought out by enlarged FIGS. 6-6B, the recesses 184 of the retainer sleeve 168 each include a slanted cam surface 185 (mentioned hereinbefore), while the opposed recesses 200 and 202 of the sleeve 186 each include a similar slanted cam surface 223, both preferably having an approximate thirty degree angulation, as does annular cam surface 89 (of the inner cylinder annular slot 88), annular surface 214A (of outer cylinder recess 214) and surface 225A of the keys 204. The respective keys 186 each have oppositely directed complementing cam surfacings 187 and 189, and the respective keys 204 each have complementing cam surfacings 225 that complement the respective cam surfaces 223, for effecting unlatching and sidewise movement of the respective sets of keys when the telescoping assemblies are actuated (as will be described hereinafter). The slanted surface 209A of annular slot or recess 209 is merely conforming to the surfacings 187 of keys 186 as keys 186 are shifted into annular slot or recess 209 as part of the ejector extension movement, as are the surfaces 214A and 225A, respectively.

The assemblies 10 are assembled in accordance with standard practices, with the ejector mechanisms 12 and 12A disposed so that their telescoping assemblies 50 are in the dormant, retracted, telescoped mode shown in FIG. 4. This is the condition that the assemblies 10 are in when they are applied to an aircraft. When a store, such as a missile 34, is to be applied to a particular assembly 10, the conventional shackle assemblies thereof are operated to effect the grasping of the missile lugs with the devices 22 of the assembly sway arms being suitably set against the missile exterior to prevent inflight sway of the missile, and to seat the vent valve member flange 125 against the store (which disposes the valve stem 114 in the sealing position shown in FIG. 4).

When the missile 34 is to be released in flight, the assembly 10 carrying same is electrically actuated to provide the ballistic gas flow suggested in the hereinbefore identified technical manual, which effects release from assembly 10 of the missile lugs as well as the ballistic gas flow indicated in FIG. 1 that proceeds to the chambers 78 or the respective mechanisms 12 and 12A, at the base ends 160 of the respective ejector mechanism 12 and 12A. The ballistic gas in question is generated by the ignition of the cartridges of the assembly 10 by conventional dual firing circuits from the aircraft release system. It is preferred that the pressure of the ballistic gas initially emitted into the chambers 78 be on the order of 400 to 600 psi.

The entry of the high pressure ballistic gases into each chamber 78 of the assembly 10 starts the first phase of the active mode of the telescoping assemblies 50, which will now be described with regard to one of the assemblies 50, since the ejecting action of both assemblies of a rack assembly 10 is the same.

As the outer cylinder latch keys 186 of an assembly 50 initially key the outer cylinder 54 to the assembly (housing 16 and 16A), the inner ends 186A of keys 186 are restrained by the inner cylinder external side surfacing 84 (see FIG. 4), and the retaining ring latch keys 204 key the retaining ring 190 to the stationary sleeve 168 (the inner ends 203A of keys 204 are restrained by the external surfacing 205 of the outer cylinder 54 to hold the key outer ends 203B in the respective retainer recesses 200 and 202 (see FIG. 4)), the inner cylinder 56 (and the components it carries) is the only cylinder of the of the assembly 50 that is free to move outwardly of its chamber 52, under the pressure of the ballistic gas acting on inner end 90 or piston 90A of same, which, for each ejector results in the inner cylinder 56 and the components it carries moving from the position of FIG. 4 to approximately the position of FIG. 5 in thrust transmitting relation to the missile exterior. However, high pressure ballistic gases that continue to enter chamber 52 also biases the outer cylinder 54 (of an assembly 50) in the direction of ejection, movement of the outer cylinder 54 being restrained by the locking keys 186 being received in the respective recesses 184 of retainer member 186; when the inner cylinder 56 has moved in its thrust transmitting direction to the point that the inner cylinder annular slot 88 is transversely aligned with keys 186 (see FIG. 6), the keys 186 start to shift radially inwardly into slot 88, under the radial force acting on the respective keys 186 by way of the slanted cam surfaces 185 (of each recess 184) acting on the key similarly slanted cam surfaces 187 (see the arrows of FIG. 6). When respective keys 186 (of an assembly 50) have fully entered into the annular slot 88 (note the complementary shape relation of the key cam surfaces 189 and slot annular cam surface 89), the inner cylinder 56 continues ejecting movement under the thrust supplied by keys 186, keys 186 being held in this position by the internal annular surfacing 220 of retainer sleeve 168 (and subsequently the corresponding surfacing 220A of the retainer ring 190 (see FIG. 6A), with the inner and outer cylinders 54 and 56 then both moving in the ejector stroke direction with the inner cylinder annular surface 156 spaced from the outer cylinder inner annular surface 211 (see FIGS. 6 and 6A), but with cylinders 54 and 56 being now keyed together by keys 186 (that do not at and beyond this point in the ejector stroke fully leave annular recess or slot 88).

In this connection, it will be seen that as the active mode of the respective assemblies 50 proceeds, the annular slot or recess 88 of the inner cylinder 56 becomes transversely aligned with the respective recesses 184 of the fixed retainer member 168 (see FIGS. 5 and 6), and the bias that is applied to the keys 186 by the action of the outer cylinder 54 on the respective keys 186, due to the high pressure ballistic gas acting on the outer cylinder 54, it results in such keys 186 being cammed, through the cam surfaces 185 of the respective recesses 184, into the inner cylinder annular slot 88, as indicated by the arrows of FIG. 6. For this purpose, the recesses 184 are each formed with the indicated cam surface 185 that cooperates with the indicated corresponding surface 187 of the respective inner keys 186 to provide the camming action involved, which has the effect of unkeying the outer cylinder 54 of each ejector from its stationary sleeve 168 (and thus its housing 16 or 16A).

In operation, the indicated camming of the keys 186 from their positions of FIG. 5 to their positions of FIG. 6, as well as the actuation of the now freed outer cylinder 54, occurs in smooth operational sequence so that the thrust applied to the store does not drop off, as it does with single piston ejectors, but continues to complete the full stroke of the dual combination piston-cylinder arrangement involved, with the ballistic gas pressure acting on both cylinders 54 and 56, with a resulting increase in output thrust.

As both cylinders 54 and 56 continue to move a predetermined nominal distance downwardly and outwardly of the chamber 52 (under the action of the ballistic gas involved) from the piston of FIG. 5, the keys 186 are brought into transverse alignment with the annular slot 209 of the retainer ring 190 (see FIG. 6B); keys 186, under the radial force acting on them by way of slanted annular cam surface 89 acting on the respective key surfaces 189 then start to and do shift into slot 209 (of ring 190), which results, when surfaces 187 of the respective keys 186 engage annular cam surface 209A of the ring recess 209 (under the outward ejector movement involved), in the retainer ring 190 being biased to move in the direction of ejection with the outer cylinder 54 (keys 186, however, remaining in cross openings 188 of the outer cylinder 54 and being in thrust applying relation to the inner cylinder 56). Here again the indicated camming action on keys 186 that results in a reverse radial movement of same into slot 209 occurs in smooth operational sequence so that the thrust applied to the store continues.

The location of the annular indentation 214 on the exterior of outer cylinder 54 is such that a predetermined nominal movement of keys 186, when in slot 209, longitudinally in the direction of ejection movement, positions annular recess 214 in transverse alignment with latch keys 204, whereby the latch keys 204, because of the outwardly directed bias then acting on the retaining ring 190 longitudinally of the direction of ejection movement, and the camming surfacings 225 (of keys 204) acting on cam surfaces 223 (of the fixed retainer 168), shift radially from the respective recesses 200 and 202 out of keying relation to the fixed retainer 168, and into annular indentation 214 (see FIG. 6B), again with the smooth operation sequence heretofore mentioned so that the thrust applied to the store continues. The fixed retainer recesses 200 and 202 are each formed with the indicated cam surfaces 223 that cooperate with the corresponding cam surfaces 225 of the respective keys 204, under the bias applied to retainer ring 190 by the outer cylinder 54 acting through keys 204, to cam keys 204 into the outer cylinder external annular slot or recess 214, which, as indicated, has the effect of fully unkeying the retaining ring 190 from the stationary sleeve 168, whereby the inner and outer cylinders continue to jointly move, and with retaining ring 190 now keyed to the outer cylinder 54, to the position of FIG. 8, which is the fully extended position of both the ejector mechanisms 12 and 12A. During the movement of the telescoping assembly 50 component parts from the relation shown in FIG. 7 to the relation shown in FIG. 8, thrust is continued to be applied fore and aft to the missile 34 and when the annular stop surface 154 of the outer cylinder 54 engages the annular stop surface 180 defined by stationary sleeve 168, the thrust action ceases, with the missile having by this time achieved adequate momentum away from the aircraft to insure, fail-safe, that the missile or other store so ejected from the assembly 10 will be thrust beyond the aircraft's air stream envelope for accurate free fall to earth. Also, the inner cylinder slot 88 is, in this positioning of assemblies 50, transversely aligned with keys 186 (see FIG. 8).

The momentum achieved by the inner cylinder valve member 108 by the end of the thrust stroke of the ejectors, on stopping of the thrust stroke, plus the pressure of the ballistic gas within the respective ejectors, shifts the valve member 108 to the ejector venting position of FIG. 8, wherein seal 122 is below and free of the throat restriction 124 of valve sleeve bore 108, and seal 132 is freed from head 110, for full venting of the ballistic gas from the ejectors therethrough.

The apertures 213 of retainer ring 190 after ejection operation of the assemblies 50, permit them to be returned to their retracted relations, for reuse by allowing keys 186 to be manually returned to the slot 88 of the respective assemblies, as by using a suitable pin for this purpose, so that the assemblies 50 can be returned to their retracted relations. For this purpose keys 204 may be suitably manually manipulated so as to return the parts of the assemblies 51 to the relation of FIG. 4.

It will thus be seen that the ejector mechanisms of the present invention are self latched in their dormant mode, fully retracted relation, when the aircraft assembly 10 supports a store for carriage by the aircraft. When it has been determined that the store, such as missile 34, is to be released in flight, the assembly 10 is actuated by the appropriate electrical signal transmitted for creating the high pressure ballistic gas that effects release of the missile 34 and its ejection from the assembly 10 by the fore and aft ejector mechanisms 12 and 12A in the manner that has been described.

It is also to be noted that, while in each of the ejector mechanisms 12 and 12A, the outer cylinder 54 remains latched in fixed relation to the respective housings 16 and 16A while the ballistic gas pressure activated within the respective telescoping assemblies 50 actuates in an ejection direction the inner cylinder 56 thereof, the outer cylinder 54 is biased by the ballistic gas pressures that results in the keys 186 being also biased to act on both cylinders and effect the reversing movement indicated (as well as keying of the inner cylinder 56 to the outer cylinder 54) for automatic and smooth unkeying of the outer cylinder 54 from the stationary sleeve 168 (and thus from the respective housings 12 and 12A), and automatic and smooth unkeying of the retaining ring 190. The arrangement of the latch mechanism involving latch keys 186 and 204 is devised so that latch keys 204 are disengaged from retainer member 168 after keys 186 engage retaining ring 190. Thus, positive sequencing is provided and full engagement of the retaining ring 190, the inner cylinder 56, the outer cylinder 54 and the sets of latch keys 186 and 204 is insured.

Figure 8:
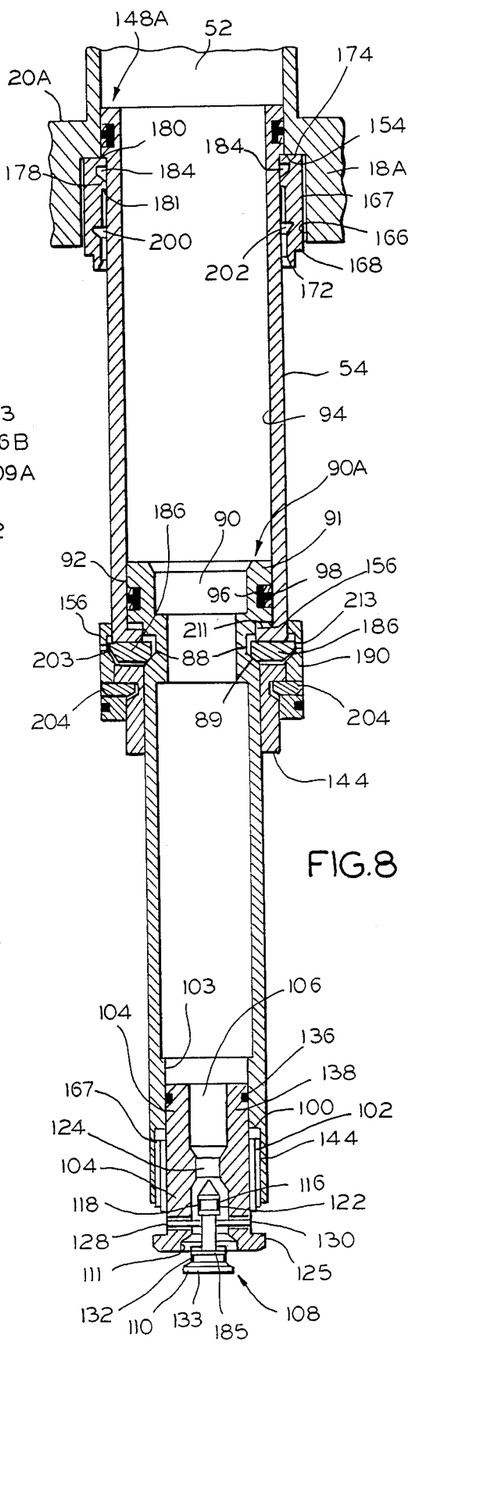
FIG. 8 is a fragmental view similar to that of FIG. 4, but showing the aft ejector mechanism in its fully extended relation.
Figure 9:
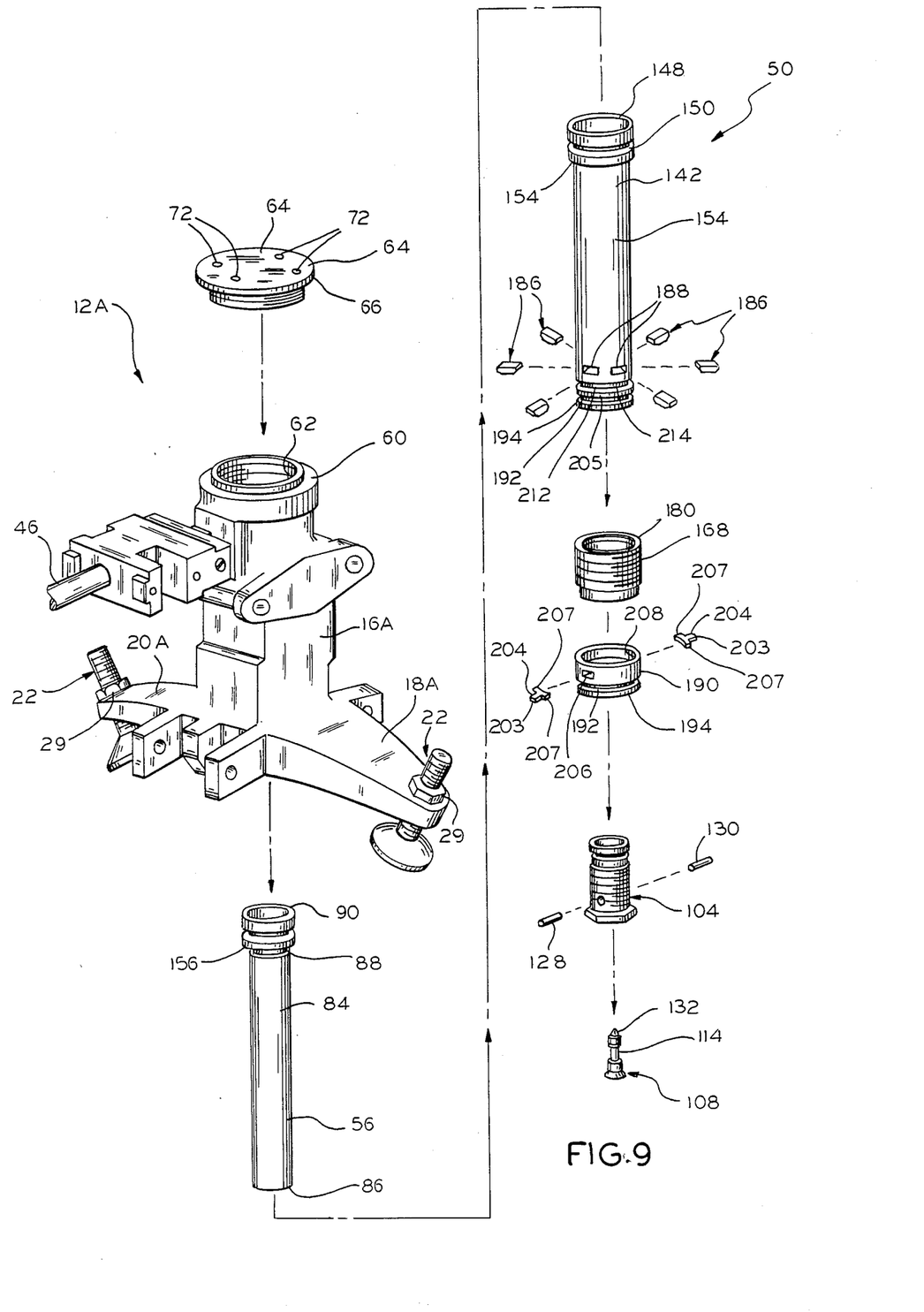
FIG. 9 is a diagrammatic exploded perspective view of the aft ejector and the telescoping assembly comprising same.

With the retainer ring 190 unkeyed from stationary sleeve 168, the inner and outer cylinders jointly continue their movement outwardly of the respective housings 16 and 16A, carrying the retaining ring 190 with them, as indicated in FIG. 8, to the relative, fully extended position indicated in FIG. 8, in which the stop surface 154 of the outer cylinder 54 engages the annular stop surface 180 defined by the stationary sleeve 168. The abrupt cessation of extended movement of the inner and outer cylinders 56 and 54, together with the remaining pressure of the ballistic gas acting on the members, thrusts the valve member 108 to the forwardly and downwardly disposed position of FIG. 8, wherein the seal 122 thereof is freed from sealing engagement with the throat 124 of the valve member 104, for venting of the ballistic gas from within the respective ejectors 12 and 12A, as indicated by FIG. 8; member 108 is retained in such position by screws 128 and 130.

In the particular reusable telescoping mechanism 50 that is illustrated for the respective ejectors 12 and 12A, the smaller diameter inner cylinder 56 moves first when the ballistic gas pressure within the telescoping assemblies 50 is the highest. This is followed thereafter by movement of the larger diameter outer cylinder 54 that acts under a lower ballistic gas pressure but provides additional piston area that continues the output thrust. The component parts are arranged so that the unbalanced force that is applied to the store by the respective fore and aft ejector mechanisms 12 and 12A acts in a more or less smoothly applied unbalanced, continuous, force as the inner and outer cylinders consecutively move to their extended relations from the respective housings 16 and 16A.

The dual piston-cylinder ejector arrangement of the present invention effects completion of the inner cylinder stroke prior to the combined inner and outer cylinder stroke when keyed together, maximizing the ejecting energy output of the ejector to the store. During the initial portion of the stroke of the ejector, the inner cylinder is acted on by the ballistic gas pressure involved, and it strokes while the outer cylinder remains keyed to the ejector housing. The inner and outer cylinders lock together later on in the ejector stroke by the latching keys 186 to complete the full ejector stroke with the ballistic gas pressure involved acting on both the ejector cylinders. This provides an increase in the total cylinder area exposed to the ballistic gas involved that continues the output thrust, rather than permitting thrust drop off, and significantly increases the thrust energy output of the ejector to the store.

During the sequencing operation of keys 186, the ejector thrust output continues as key 186 enters inner cylinder annular recess 88. As keys 186 are cammed in the reverse direction into retaining ring recess 209, the thrust output to the store continues; the thrust output on the store then further continues to complete the full ejector stroke, with the result that the store experiences a significant increase in over all output thrust for each ejector of an assembly 10.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In a store rack assembly having fore and aft store ejector mechanisms, the improvement where each ejector mechanism comprises:

a telescoping assembly including an elongate housing defining an internal chamber extending longitudinally thereof and mounting in said chamber an outer cylinder and an inner cylinder within said outer cylinder, said chamber and said cylinders being in telescoped substantially coaxial dormant relation and said cylinders having like ends of same disposed adjacent one end of said housing, said housing being connected to a source of ballistic gas and including means for exposing said like ends of said cylinders to the ballistic gas when the source of the ballistic gas supplies the ballistic gas to said housing, said cylinders at their other ends being exposed exteriorly of the other end of said housing for movement to their extended relations therefrom, said housing at said other end including means defining a first lateral aperture and a second lateral aperture spaced from said first lateral aperture axially of said cylinders toward said other end of said housing, with said apertures being aligned circumferentially of said housing, said inner cylinder defining adjacent the other end of same an internal flange that substantially complements the internal diameter of said outer cylinder and is proportioned for substantially complementary sliding fit within said outer cylinder, and said inner cylinder defining an external recess thereabout adjacent said flange having a cam surfacing adjacent same in coaxial relation thereto, a first latch member interposed between said first lateral aperture and said inner cylinder surfacing and extending through an opening formed in said outer cylinder in the dormant mode of said telescoping assembly, said housing first lateral aperture including a cam surfacing that serves to bias said first latch member radially inwardly, when said like ends of said cylinders are exposed to the ballistic gas when supplied to said housing for actuating said telescoping assembly to move from said dormant mode thereof, for camming said first latch member into said inner cylinder recess when said inner cylinder flange is adjacent said outer cylinder other end, whereby said cylinders are then both keyed together for joint movement outwardly of said housing chamber axially thereof in the direction of the other ends of said cylinders under the pressure of the ballistic gas exposed to said like ends of said cylinders, with said outer cylinder at said one end thereof defining an annular flange proportioned for substantially complementary sliding fit within said housing chamber, and said outer cylinder being recessed adjacent said other end thereof in circumambient alignment with said second lateral aperture, a sleeve slidably mounted in said housing in circumambient relation to said outer cylinder said like end when said cylinders are in their dormant relation, said sleeve defining an internal recess thereabout intermediate said first and second apertures axially of the respective ejector assemblies, a second latch member interposed between said second lateral aperture and said outer cylinder and extending through an opening formed in said sleeve, said inner cylinder cam surfacing biasing said first latch member into said sleeve recess when said inner cylinder recess is aligned with said sleeve recess, whereby said sleeve is biased outwardly of said housing, said housing second lateral aperture including a cam surfacing that serves to bias said outer latch member radially inwardly, when said first latch member biases said sleeve for movement in said direction, for camming said second latch member into said outer cylinder recess, whereby said second latch member keys said sleeve to said outer cylinder for movement therewith in said direction therewith, said flange of said outer cylinder engaging stop means defined by said housing within said chamber thereof, to provide the extended relation of said cylinders under the bias of said ballistic gas.

2. The improvement set forth in claim 1 wherein:
said inner cylinder is valved at said other end thereof for venting the ballistic gas therefrom in the extended relation of said cylinders.

3. The improvement set forth in claim 1 wherein:
said lateral apertures are formed in a second sleeve that is fixedly mounted in said housing.

4. The improvement set forth in claim 1 wherein:
said cylinders are proportioned for providing substantially continuous thrust at said other end of said inner cylinder during the movement of said telescoping assembly to extended relation under the action of the ballistic gas exposed to said cylinders.

5. The improvement set forth in claim 1 wherein:
said cylinders are of similar length and are substantially masked by said housing in the dormant relation thereof.

6. In a store ejector mechanism for store racks or the like, said ejector mechanism comprising:

a telescoping assembly including an elongate housing defining an internal chamber extending longitudinally thereof and mounting in said chamber an outer cylinder and an inner cylinder within said outer cylinder, said chamber and said cylinders being in telescoped substantially coaxial dormant relation and said cylinders having like ends of same disposed adjacent one end of said housing, said housing being connected to a source of ballistic ga and including means for exposing said like ends of said cylinders to the ballistic gas when the source of the ballistic gas supplies the ballistic gas to said housing, said cylinders at their other ends being exposed exteriorly of the other end of said housing for movement to their extended relations therefrom, said housing at said other end including means defining a first lateral aperture and a second lateral aperture spaced from said first lateral aperture axially of said cylinders toward said other end of said housing, with said apertures being aligned circumferentially of said housing, said inner cylinder defining adjacent the other end of same an external flange that substantially complements the internal diameter of said outer cylinder and is proportioned for substantially complementary sliding fit within said outer cylinder, and said inner cylinder defining an internal recess thereabout adjacent said flange having a cam surfacing adjacent same in coaxial relation thereto, a first latch member interposed between said first lateral aperture and said inner cylinder surfacing and extending through an opening formed in said outer cylinder in the formant mode of said telescoping assembly, said housing first lateral aperture including a cam surfacing that serves to bias said first latch member radially inwardly, when said like ends of said cylinders are exposed to the ballistic gas when supplied to said housing for actuating said telescoping assembly to move from said dormant mode thereof, for camming said first latch member into said inner cylinder recess when said inner cylinder flange is adjacent said outer cylinder other end, whereby said cylinders are then both keyed together for joint movement outwardly of said housing chamber axially thereof in the direction of the other ends of said cylinders under the pressure of the ballistic gas exposed to said like ends of said cylinders, with said outer cylinder at said one end thereof defining an annular flange proportioned for substantially complementary sliding fit within said housing chamber, and said outer cylinder being recessed adjacent said other end thereof in circumambient alignment with said second lateral aperture, a sleeve slidably mounted in said housing in circumambient relation to said outer cylinder said like end when said cylinders are in their dormant relation of less external diameter, said sleeve defining an internal recess thereabout intermediate said first and second apertures axially of said assembly, a second latch member interposed between said second lateral aperture and said outer cylinder and extending through an opening formed in said sleeve, said inner cylinder cam surfacing biasing said first latch member into said sleeve recess when said inner cylinder recess is aligned with said sleeve recess axially of said assembly, whereby said sleeve is biased outwardly of said housing, said housing second lateral aperture including a cam surfacing that serves to bias said outer latch member radially inwardly, when said first latch member biases said sleeve for movement in said direction, for camming said second latch member into said outer cylinder recess, whereby said second latch member keys said sleeve to said outer cylinder for movement therewith in said direction therewith, said flange of said outer cylinder engaging stop means defined by said housing within said chamber thereof, to provide the extended relation of said cylinders under the bias of said ballistic gas.

7. The ejector mechanism set forth in claim 6 wherein:

said lateral apertures are formed in a sleeve that is fixedly mounted in said housing adjacent said other end thereof.

8. The ejector mechanism set forth in claim 7 wherein:
said cylinders are proportioned for providing substantially continuous thrust at said other end of said inner cylinder during the movement of said telescoping assembly to extended relation under the action of the ballistic gas exposed to said cylinders.

9. The ejector mechanism set forth in claim 7 wherein:
said cylinders are of similar length and are substantially masked by said housing in the formant relation thereof.

* * * * *